(12) United States Patent
Motakef

(10) Patent No.: US 8,887,925 B2
(45) Date of Patent: Nov. 18, 2014

(54) WEDGE BAR FOR INERTIAL SEPARATION

(76) Inventor: Abbas Motakef, Duluth, GA (US)

( * ) Notice: Subject to any disclaimer, the term of this patent is extended or adjusted under 35 U.S.C. 154(b) by 521 days.

(21) Appl. No.: 12/924,003

(22) Filed: Sep. 20, 2010

(65) Prior Publication Data
US 2011/0315623 A1 Dec. 29, 2011

Related U.S. Application Data

(60) Provisional application No. 61/398,409, filed on Jun. 25, 2010.

(51) Int. Cl.
C02F 1/38 (2006.01)
B01D 21/26 (2006.01)
B01D 29/44 (2006.01)
C02F 1/00 (2006.01)
B01D 39/14 (2006.01)

(52) U.S. Cl.
CPC .......... B01D 29/44 (2013.01); B01D 2201/184 (2013.01)
USPC ......... 210/499; 210/787; 210/788; 210/747.5

(58) Field of Classification Search
CPC ................ B01D 29/44; B01D 29/445; B01D 2201/184; B01D 2029/033
USPC ............ 210/499, 787, 788, 747.5, 747.6, 784
See application file for complete search history.

(56) References Cited

U.S. PATENT DOCUMENTS

| 5,047,148 | A | * | 9/1991 | Arai | 210/498 |
| 5,791,495 | A | * | 8/1998 | Gero et al. | 209/395 |
| 6,039,841 | A | * | 3/2000 | Hernesniemi | 162/251 |
| 6,284,145 | B1 | * | 9/2001 | Andersson | 210/767 |
| 6,521,096 | B1 | * | 2/2003 | Jurvanen | 162/380 |
| 7,125,491 | B2 | * | 10/2006 | Gabl et al. | 210/497.01 |
| 2011/0146802 | A1 | * | 6/2011 | Feher | 137/1 |

* cited by examiner

Primary Examiner — Nam Nguyen
Assistant Examiner — Madeline Gonzalez

(57) ABSTRACT

Asymmetrically profiled wedge bar screen used for inertial separation of suspended particles, wherein the profile of the bars is a generalized trapezoid, tilted in the direction of the sweeping flow with a distinctly extended trailing edge at the aft face side of the cross section of the bar.

9 Claims, 3 Drawing Sheets

WEDGE BAR FOR INERTIAL SEPARATION

TECHNICAL FIELD

The present application relates generally to inertial separation of particulates suspended in fluids and more specifically relates to water intake screens.

BACKGROUND OF THE INVENTION

Separation of suspended particulates from fluids is a common filtration engineering task. Solid, semi-solid or gel-like particulates may be suspended in a gas or liquid in motion predominantly if the particulate density is close to the density of the surrounding fluid. Small water droplets and salt spray-mist, dust etc, may be suspended in the ambient air in motion. Rivers and large bodies of water may have floating particles, aquatic life, small fish egg and larvae in them. Induced local acceleration is used—typically by changing the local (small scale) flow pattern of the fluid—to induce inertial forces to the suspended particles. The inertial forces result in the partial or full separation of floating particles. The concentration of particles is low or close to zero in the filtrate stream and high in the concentrate stream. The efficiency of separation is commonly expressed as the ratio of particle concentration in filtrate stream over the particle concentration in the feed stream. There are several known inertial separation technologies. Demister vanes, marine vane separators, variety of cyclones, inertial spin tubes etc.

Wedge wire screens (WWS) are widely used in large water intake systems. The WWS is used to prevent debris, small fish and aquatic life from ingestion into the intake system. The symmetrical trapezoid shaped profile of the wire reduces the likelihood of screens from becoming plugged-up. The widening channels formed between the wires facilitate the free passage of water and suspended particles smaller than the gap (face-side opening) between the wires. The disadvantage of WWS is that it can only filter particles larger than the gap size between the wires and that it is prone to impingement of particles, organisms and objects on the outer surface of the screen. The other main disadvantage of the WWS is that suspended seaweed and long string-like algae can also entangle in it and cover up large surface areas causing flow restriction or blockage.

There are few existing technologies that employ sweeping flow to facilitate and improve the separation of suspended matter. The sweeping flow is a secondary component of the approach (or main inlet) flow. The sweeping component is tangential to the surface of the screen while the pass-through flow is perpendicular to the surface. The existing sweeping flow technologies utilize natural gravity or pump/circulator induced flow to create the required tangential flow over the surface of the screen. The sweeping flow technologies utilize wedge wire screens for inertial separation and for their reliable low-maintenance performance.

The disadvantage of the currently known wedge wire screens for sweeping flow applications is that their particle-separation efficiency is poor. The inertial forces determining the efficiency of separation are relatively low. The acceleration of flow—determining the separation forces—is reversely proportional to the curvature of streamlines within the boundary layer. The curvatures of streamlines entering the channels of the screen are relatively large. This results in a carry-through of considerable percentage of particles through the screen. To offset the lack of separation efficiency, small gap-size (more closed) screens are applied. The dense screen mesh however is susceptive to impingement of particles of larger size and screen surface clog-up.

SUMMARY OF THE INVENTION

The present application describes an inlet screen for inertial separation of suspended particles in fluids. The inlet screen comprises of multitude of parallel, evenly spaced, asymmetrically profiled wedge-bars with a flow separation edge on the trailing end of the profile. The flow separation edge is partially protruding from the face of the screen into the tangential sweeping flow. The protruding edge facilitates a formation of sharply curved streamlines of the flow passing through the gaps of the screen for high acceleration and effective inertial separation of particles. The protruding edge also facilitates a formation of gently curved un-separated sweeping streamlines that provide bridge effect for particles over the gaps of the screen. The asymmetrical profile, combined with the separation edge minimizes the thickness of the entrainment boundary layer within which the small particles may pass through the screen. The angle between the direction of tangential sweeping flow and the direction of the passing flow is an obtuse one.

These and other features of the present application will become apparent to one of ordinary skill in the art upon review of the following detailed description when taken in conjunction with the several drawings and the appended claims.

DETAILED DESCRIPTION

Figure 1:
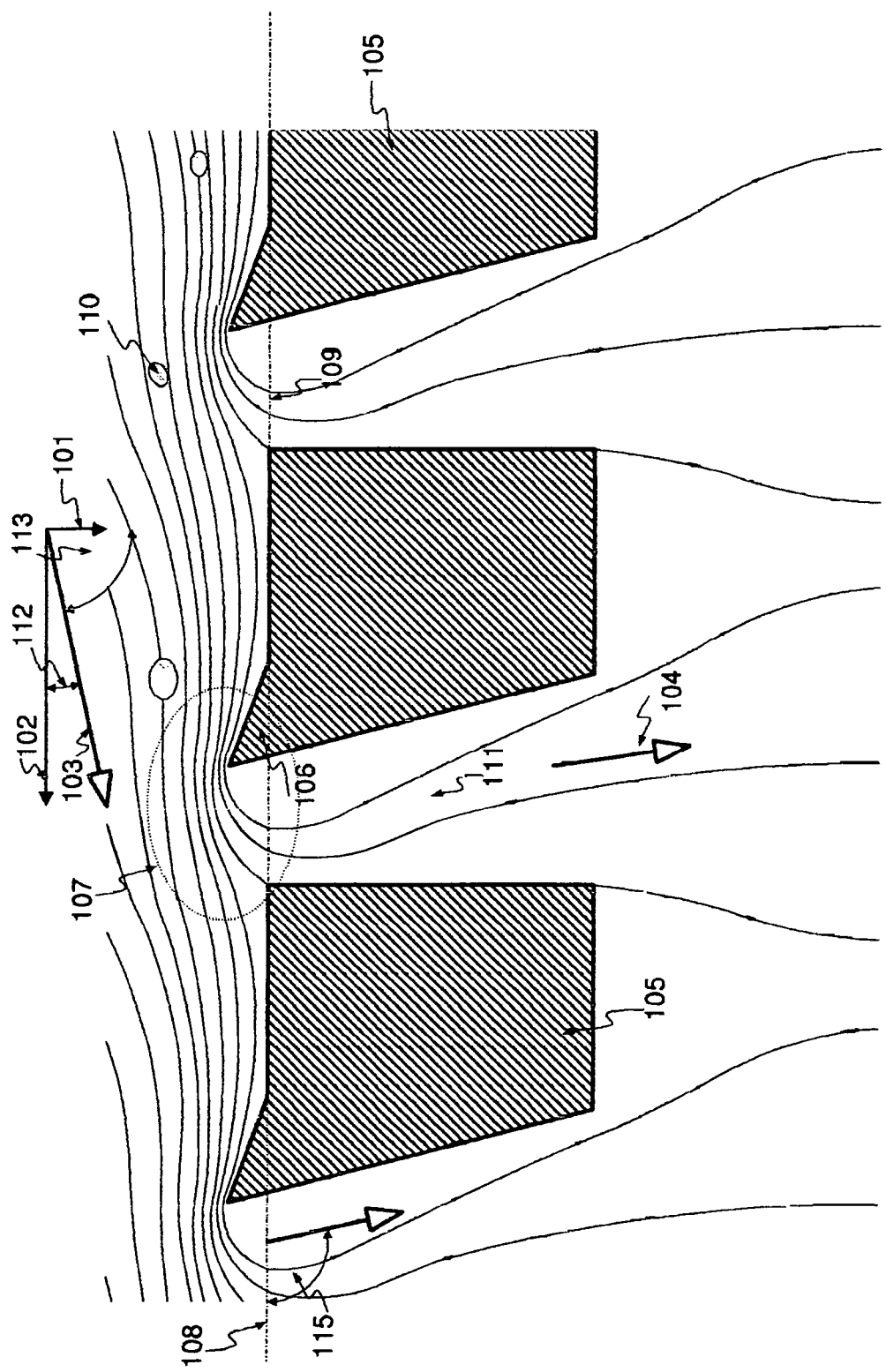
FIG. 1 shows the flow pattern of the fluid approaching, sweeping over, and passing the asymmetric profiled wedge bar screen.

Referring now to the drawings, in which like numerals indicate like elements throughout the several views, FIG. 1 shows a cross sectional view of one embodiment of the wedge-bar screen and the surrounding fluid flow pattern. Multitude of parallel, asymmetrically profiled long bars 105 are evenly spaced along the face of the screen 108, separated by gaps 109 that form the mesh of the screen. The sidewalls of the bars form passage channels 111 for the fluid. The face of the screen may be in a horizontal, vertical plane or may take any angle relative to gravity. The function of the screen is to prevent the suspended floating particles 110 from passing through it (entrainment) and impingement on the screen and blockage of the fluid. The fluid that may be liquid or gas approaches the screen with a fluid velocity 103 and passes through the screen with a pass-through velocity 104. The fluid velocity has a face-approach velocity 101 component, perpendicular to the face and a sweep-flow velocity 102 component, parallel to the face and perpendicular to the length of the bars. The approach angle 112 is a small, sharp-angle that may vary approximately from 3 to 40 degrees. The pass-through angle 115 is an obtuse angle that may vary approximately from 90 to 120 degrees. The profile of the bars is a generalized asymmetrical trapezoid tilted in the direction of the sweeping flow with a distinctly extended trailing edge 106 at the aft side of the bar, protruding into the flow-pattern of the fluid. The inertial separation takes place in the separation zone 107. The function of the trailing edge 106 is to provide flow separation and create localized eddies (on the suction side of the trailing edge) that shape highly curved streamlines of the separation zone. It also reduces the thickness of the boundary layer of the sweeping flow near the tip of the edge on the pressurized side of the trailing edge. This reduction is achieved by increasing the tangential (sweep) velocity over the pressurized side of the edge.

Figure 2:
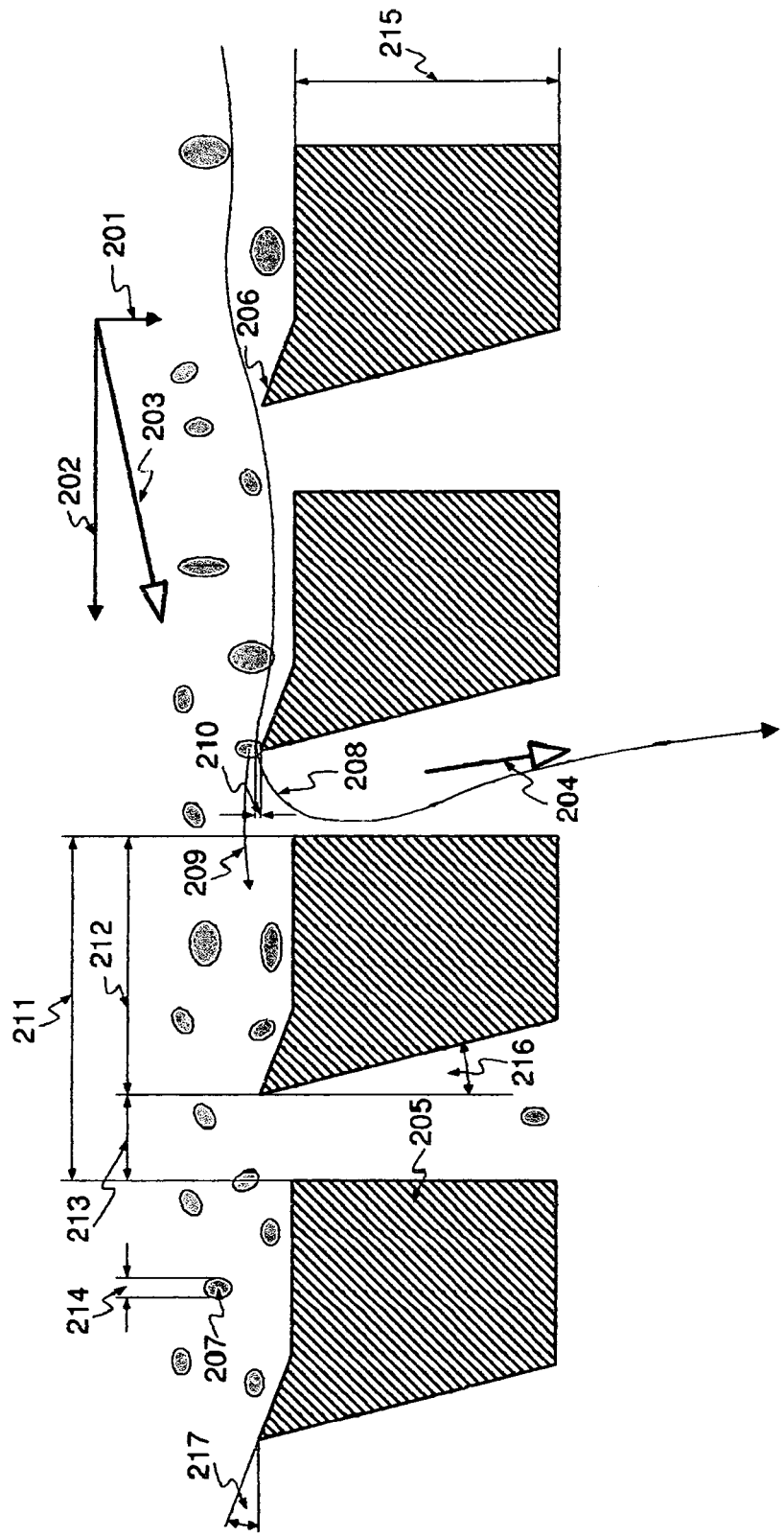
FIG. 2 shows the approximate proportions of the separated particles, the wedge bar profile and the gap size of the screen. It also depicts the effects of acceleration induced inertial separation.

FIG. 2 shows the main proportions of the geometry of one embodiment of the asymmetrical wedge bar and the inertial separation screen. The width of the wedge bar 212 may vary from approximately 0.1" to 4" or even more. The pitch of the screen 211 is the spacing of the bars that may vary approximately from 110% to 250% of the wedge bar width 212. The gap (clearance or opening) 213 between the wedge bars may vary approximately from 10% to 150% of the wedge bar width. The height of the wedge bar 215 (or the thickness of the screen) may vary approximately from 20% to 150% of the wedge bar width. The back angle of the wedge bar 216 may vary approximately from 2 to 45 degrees. The deviation (or protrusion) angle of the trailing edge 217 may also vary approximately from 2 to 45 degrees. The size 214 of the separated particle 207 may be larger, equal, or substantially smaller than the gap 213.

FIG. 2 also depicts the mechanism of inertial separation. The flow accelerates along the streamline 208 as it approaches the trailing edge. Once the flow leaves the edge it turns along a curved path with small-radius into the channel between two adjacent wedge-bars. The highly curved flow-path induces the additional centrifugal acceleration that is required for the inertial separation of floating particle. The particle continues on a bridge-path 209 and is swept across the gap. As the sweeping flow approaching and the trailing edge accelerates, the thickness of the boundary layer is reduced to 210 such that it becomes substantially smaller than the size of the suspended particle. The particles smaller than the boundary layer have lower chance to be separated by the curved flow leaving the edge and may be entrained through the screen.

Figure 3:
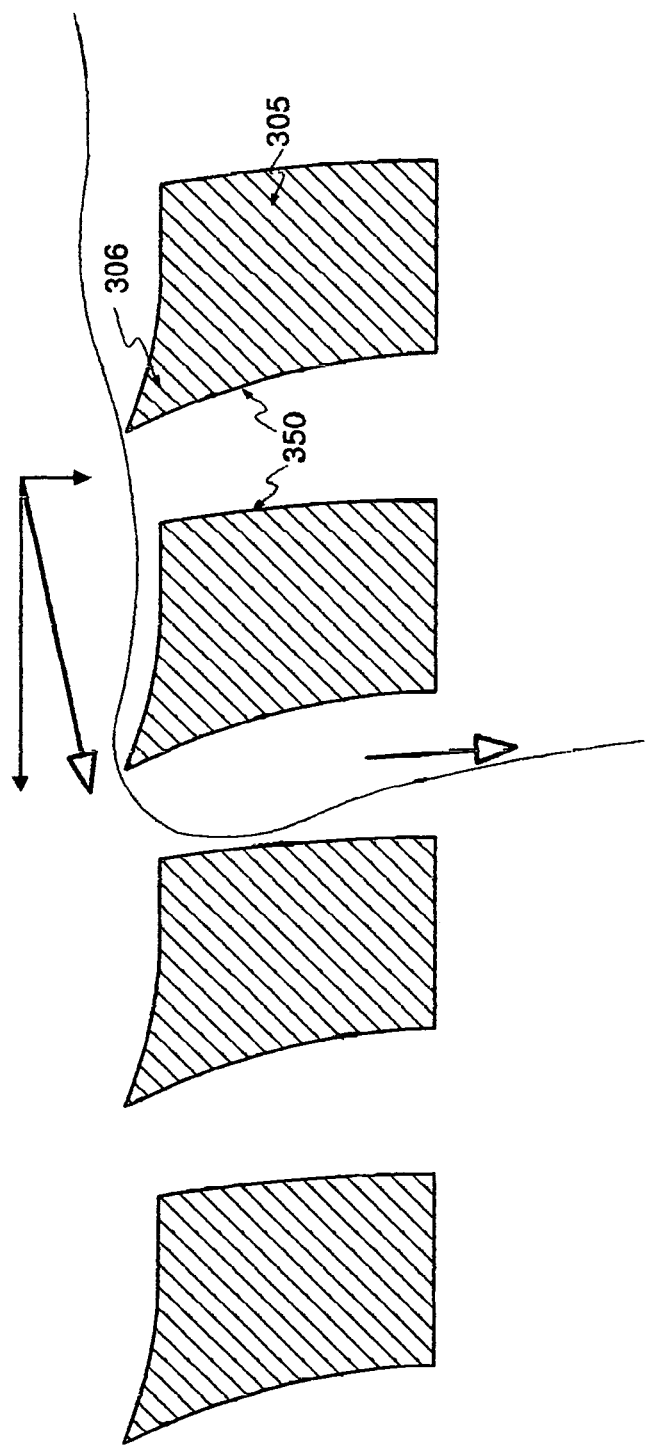
FIG. 3 depicts another embodiment of the asymmetric profile wedge bar screen.

FIG. 3 shows another embodiment of the inertial separation wedge bar screen. The contours of the wedge bar are curved and streamlined to optimize the flow conditions required for inertial separation.

I claim:

1. An asymmetrically profiled wedge bar screen comprised of a plurality of wedge bars used for sweeping flow assisted inertial separation of suspended particles in a fluid, wherein the profile of the wedge bars is a generalized trapezoid, tilted in the direction of the sweeping flow with a distinctly extended trailing edge at the aft face side of the cross section of the wedge bars which is immediately followed with a smooth, plane or curved, side wall with no protrusion into a gap between two adjacent wedge bars and wherein the trailing edge is protruding with a pointed edge into a tangential flow-pattern of the fluid and wherein the trailing edge induces a flow separation and creates localized eddies on a suction side of the trailing edge that shape highly curved fluid flow streamlines and thus creates centrifugal forces required for inertial separation and wherein the gap is larger than the size of the particles separated from the fluid.

2. The asymmetrically profiled wedge bar screen of claim 1 wherein the width of the wedge bar may vary from 0.1" to 4" and wherein the height of the wedge bar may vary approximately from 20% to 150% of the wedge bar width.

3. The asymmetrically profiled wedge bar screen of claim 1 wherein the pitch of the screen is the shortest distance between the leading edges of two adjacent wedge bars and wherein the pitch may vary from 110% to 250% of the wedge bar width.

4. The asymmetrically profiled wedge bar screen of claim 1 wherein the gap of the wedge bar screen is the shortest distance between two adjacent wedge bars and wherein the gap may vary from 10% to 100% of the wedge bar width.

5. The asymmetrically profiled wedge bar screen of claim 1 wherein the back angle is the angle measured between the pass-through flow direction—perpendicular to the face of the wedge bar screen and the pass-through gap side surface of the trailing edge—and wherein the back angle (216) of the wedge bars may vary from 2 to 45 degrees.

6. The asymmetrically profiled wedge bar screen of claim 1 wherein the deviation angle is the angle measured between the face of the wedge bar screen and the face side of the trailing edge and wherein the deviation angle (217) of the trailing edge may vary from 2 to 45 degrees.

7. The asymmetrically profiled wedge bar screen of claim 1 wherein the profile of the wedge bars may be comprised of straight or curved lines.

8. The asymmetrically profiled wedge bar screen of claim 1 wherein the leading edge of the wedge bars is a smooth, plane or curved, side wall with no protrusion into the gap.

9. The asymmetrically profiled wedge bar screen of claim 1 wherein the fluid flow streamlines approaches the wedge bar screen in a velocity that has a face-approach component that is perpendicular to a surface of the wedge bar screen and a sweep-flow component that is in parallel to the surface of the wedge bar screen, and wherein the angle between the face approach velocity and the sweep-flow components may vary from 3 to 40 degrees.

* * * * *